INVENTORS.
Arthur T. Taylor

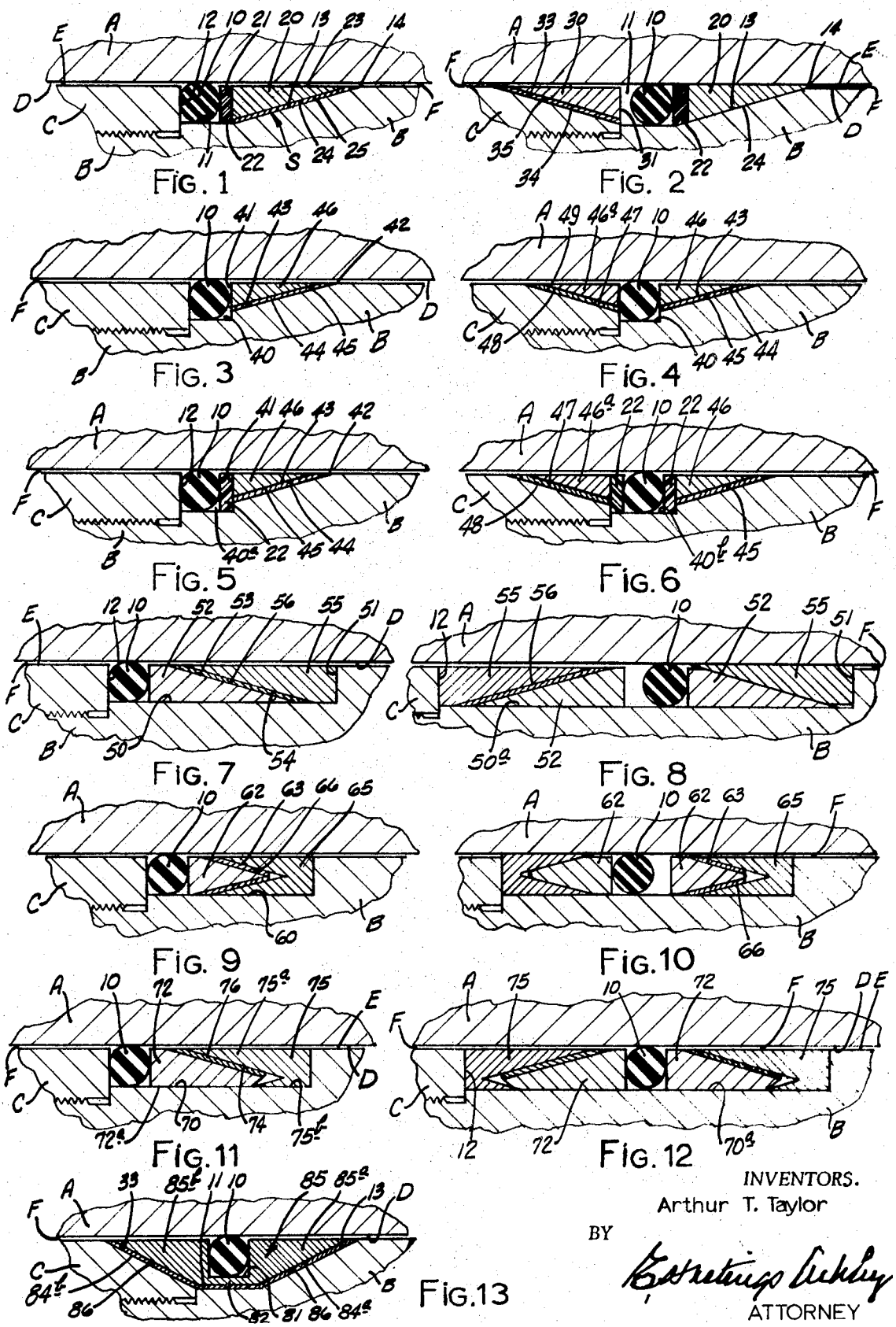

INVENTORS.
Arthur T. Taylor
BY
ATTORNEY

United States Patent Office 3,606,348
Patented Sept. 20, 1971

3,606,348
SEALS
Arthur T. Taylor, 2102 Crosby Road,
Carrollton, Tex. 75006
Filed Mar. 11, 1970, Ser. No. 18,628
Int. Cl. F16j *15/00*
U.S. Cl. 277—26
25 Claims

ABSTRACT OF THE DISCLOSURE

Seal assemblies having a primary initial seal means operative for sealing between two members at varying conditions of pressure at normal temperatures below a predetermined elevated temperature, and secondary malleable metallic seal means which is movable by fluid pressure acting through the primary seal to provide a metal to metal seal between said members upon occurrence of a temperature at said seal assemblies equal to or in excess of said predetermined elevated temperature. Means is provided for holding or restraining the secondary seal means in non-sealing position until the occurrence at least of the predetermined elevated temperature, and which is yieldable or releasable to permit said secondary seal means to be moved to an effective sealing position by the pressure acting on said primary seal prior to destruction or damage of primary seal as a result of the elevated temperature. Several types of primary and secondary seals are illustrated.

OBJECTS OF THE INVENTION

This invention relates to new and useful improvements in seals.

It is one object of the invention to provide an improved seal means having a secondary seal means incorporated therein initially inoperative and movable to operative sealing position upon the occurrence of a predetermined temperature condition.

A particular object of the invention is to provide a seal means having a primary seal for sealing at normal conditions of temperature against low or high pressures, and having a secondary seal means initially held out of sealing position and movable to sealing position upon the occurrence of a predetermined temperature condition at the seal means to effect a seal under temperatures at or in excess of the predetermined temperatures.

Still another object of the invention is to provide a seal means of the character described wherein the secondary seal means has portions engageable in metal to metal contact with the members being sealed to assure a high temperature resistant metal-to-metal seal being effected thereby.

Still another object of the invention is to provide a seal of the character described wherein the secondary seal means is held in the inoperative position by means operable to release the secondary seal means for movement to sealing position upon the occurrence of a temperature in excess of a predetermined temperature, and wherein the primary seal means moves the secondary seal means from inoperative to operative sealing position upon release of the holding means restraining said secondary seal means for such movement.

Still another object of the invention is to provide a seal of the character described wherein the means holding the secondary seal means against movement from inoperative to operative sealing position is operative to release said secondary seal means for such movement prior to the occurrence of an elevated temperature which would damage or destroy the primary seal means, whereby the primary seal means is effective to move the secondary seal means to sealing position prior to such damage or destruction.

It is still another object of the invention to provide a sealing means of the character described wherein the secondary seal means is a metallic substance which will withstand extremely high temperatures, such as occur in oil well fires, to provide a means for sealing off a valve in an oil well flow line exposed to such a fire before destruction of the normal seal means, and which will maintain the seal after destruction of the initial normal seal means.

Still another object of the invention is to provide a seal of the character set forth which is effective to seal against pressures in either direction past the seal means.

Still another object of the invention is to provide in a seal of the character described means for holding said secondary seal means in inactive non-sealing position comprising an adhesive, such as an epoxy resin or similar high temperature vaporizing plastic, or a low temperature melting metal such as cerrometal, tin or the like, whereby the secondary seal means is releasably held in the inoperative inactive non-sealing position and is movable to active sealing position upon melting or vaporizing of the plastic or other adhesive, or liquefication of the adhesive or holding means, or liquefication of the metal.

A further object is to provide in a seal of the character set forth a propping ring or like restraining means which holds the secondary seal means against movement until the propping ring or restraining means yields at a predetermined temperature to permit the secondary seal means member to be moved to sealing position by the primary seal means.

Still another object of the invention is to provide in a seal of the character described secondary seal means movable in either direction with respect to the primary seal means to seal off flow in either direction upon occurrence of conditions releasing said secondary seal means for movement to sealing position and wherein said primary seal means is effective to move either of said secondary seal means in the direction of application of pressure.

A further object of the invention is to provide a seal means of the character set forth having a pair of opposed oppositely directed secondary seal means initially held in inoperative position, each of which is releasable upon the occurrence of a predetermined elevated temperature condition at said secondary seal means for movement to operative sealing position, and wherein the primary seal means is operative with respect to either of said secondary seal means to move said secondary seal means in the direction of application of fluid pressure to close off fluid flow therepast, or to close off fluid pressure, thereby moving the necessary secondary seal means downstream of the flow fluid or application of fluid pressure to closed sealing position.

Still another object of the invention is to provide in a seal means of the character described seal means having a pair of opposed oppositely directed secondary seal means movable in opposite directions to close off fluid pressure in either direction, and wherein said secondary seal means are joined together and provide a support for said primary seal means, whereby the primary seal means is operative to move both of said secondary seal means in the direction of fluid flow or application of fluid pressure to sealing position.

Additional objects and advantages of the invention will be readily apparent from the reading of the following description of a device constructed in accordance with the invention, and reference to the accompanying drawings thereof, wherein:

FIG. 1 is a transverse sectional view through a seal assembly constructed in accordance with the invention showing a primary seal means in operative position and a secondary seal means held in an inoperative position between two members;

FIG. 2 is a view similar to FIG. 1 showing a modified form of the seal means having oppositely acting secondary seal means, one of which is shown moved to operative sealing position;

FIG. 3 is a view similar to FIG. 1 with a slightly modified form of seal means;

FIG. 4 is a view of a seal means of the character illustrated in FIG. 3 having oppositely acting secondary seal means;

FIG. 5 is a view of a slightly modified seal means of the character illustrated in FIG. 3 having a back-up ring interposed between the primary seal and the secondary seal;

FIG. 6 is a view similar to FIG. 4 showing oppositely directed secondary seal means having back-up rings between the primary seal and the secondary seal means;

FIG. 7 is a view similar to FIG. 1 showing a further modified form of the primary and secondary seal means;

FIG. 8 is a view showing a seal means of the character of the type illustrated in FIG. 7 having secondary seal means operative in opposite directions, showing one secondary seal means moved to operative sealing position;

FIG. 9 is a view similar to FIG. 7 of the slightly modified form of the seal means having V-type secondary seal means;

FIG. 10 is a view of the modified form of secondary seal means of FIG. 9 showing two V-type secondary seal means operative in opposite directions on opposite sides of the primary seal, one of the secondary seals being shown moved to sealing position;

FIG. 11 is a view similar to FIG. 10 of the slightly modified form of the V-type secondary seal means;

FIG. 12 is a view of the slightly modified V-type form of secondary seal means of FIG. 11 having a pair of opposed secondary seal means operative in opposite directions;

FIG. 13 is a view of a further modified form of seal means having a pair of opposed secondary seal means operative to seal in opposite directions, but movable as a unit with the primary seal means;

Figure 14:
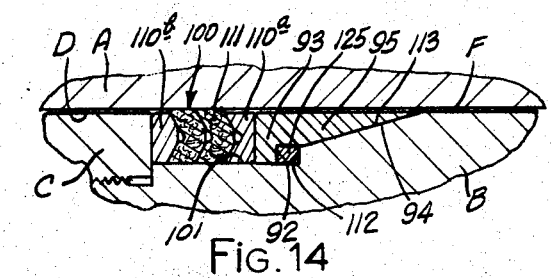
FIG. 14 is a view similar to FIG. 1 showing a further modified form of secondary seal means having yieldable propping or restraining means for holding secondary seal means in non-sealing position, and having V-type primary seal means.

In the drawings, the letter A designates a first member and the letter B designates a second member, either one of which may be a cylindrical member disposed in a cylindrical bore formed in the other member. There is a slight space forming a flow passage F between the two members A and B, and the seal means S of the invention is disposed in an annular recess 11 in the member B to seal against the member A to close off fluid flow through the passage F.

A primary seal 10, shown to be an elastomeric O-ring, is disposed in the recess 11 formed in the member B and provides a primary seal at low or high fluid pressures, at normal temperatures, to prevent fluid flow through the passage F between the members A and B. As shown, the O-ring is insertable in the recess 11 in the member B and a retaining member C may be threaded on the member B to provide a shoulder 12 at one end of the recess 11 against which the O-ring 10 is adapted to engage and seal. An elongate inclined or tapered wedge surface 13 is formed in the recess 11 at the end portion thereof opposite the threaded retaining member C and slopes from the bottom of the recess 11 to the surface of the member B, merging with the flow passage F as at 14. A secondary seal member 20 is disposed within the recess 11 and has a shoulder 21 at one end against which a back up or follower ring 22 engages. The secondary seal member 20 has an axial cylindrical surface 23 which conforms to and lies co-extensive with the cylindrical surfaces of the member B and the retainer member C to form a continuation of the flow passage F therepast. The opposite surface 24 of the secondary seal is inclined complementary to the inclined or wedge surface 13 in the recess, and an adhesive retaining, holding and restraining means 25 is disposed between the inclined surface 13 on the member B and the inclined surface 24 of the secondary seal member. The secondary seal member may be a malleable metal material such as soft copper, aluminum or malleable copper-nickel alloy, or the like, which may be deformed under pressure to engage and seal between the members A and B at approximately the point 14 in the flow passage F. The retaining or restraining means 25 is preferably a suitable adhesive, such as an epoxy resin plastic adhesive, or Cerrometal, or tin solder, or the like, having a low temperature melting or vaporizing point, which will release the secondary seal member 20 for movement along the inclined surface 13 to move the same into sealing engagement with the members A and B to close off the flow passage F.

The members A and B have been described generally, without designation of whether the member A is a cylindrical shaft and the member B a cylinder or vice versa.

Figure 30:
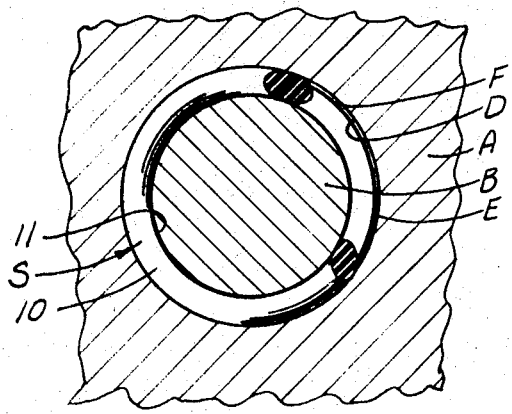
FIG. 30 is a fragmentary cross-sectional view illustrating generally the circular character of the primary and secondary seal means, expansible to engage a cylindrical bore wall surrounding a cylindrical member; and, FIG. 31 is a fragmentary sectional view showing a secondary seal member disposed to be contracted into sealing engagement with a cylindrical member in a cylindrical bore.
Figure 31:
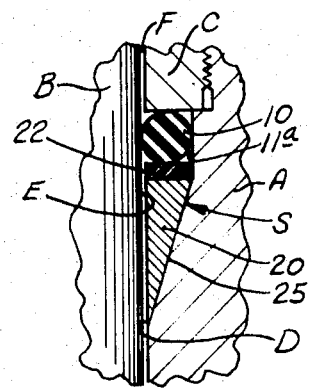

FIG. 30 shows the seal assembly S mounted in an external annular recess 11 in a rod or shaft member B and disposed to seal against the bore wall D of the body A. FIG. 31 shows the seal assembly S mounted in an internal annular recess 11a in the bore wall D of the body member A and disposed to seal against the cylindrical external surface of the rod or shaft member B. It will thus be seen that the seal assembly may be mounted on either member to seal between the two. For the sake of ease of description, the member A will be designated as a body having a cylindrical bore wall D and the member B will be described as a piston or shaft having an external cylindrical surface E, and between the surfaces D and E the flow passage F is formed due to the difference in dimensions or diameters of the cylindrical bore and shaft. The secondary seal means 20 is therefore adapted to be expanded along the inclined surface 13 on the shaft B into engagement with the bore wall D of the cylinder member A. The backup or anti-extrusion follower ring 22 is preferably of a plastic material of low coefficient of friction, such as "Teflon" or nylon. The backup ring or anti-extrusion ring provides a shoulder against which the O-ring 10 may seat to close off flow through the passage F from left to right in FIG. 1 under normal pressure and temperature conditions.

The material of which the O-ring 10 is formed is ordinarily of an elastomeric composition which is affected substantially by high temperatures, such as occur where fires in oil wells act on the seals of valves in the flow lines or well head connections of such wells. Such O-ring seals will be severely damaged or destroyed by such high temperatures. Therefore, to prevent a leak developing at a valve under conditions of fire or other conditions creating an elevated temperature beyond a predetermined degree, the secondary seal member 20 is provided.

The adhesive or restraining means 25 is selected from a group of materials which have a melting or vaporizing point lower than the temperature at which the O-ring primary seal 10 will be damaged or destroyed, so that the restraining effect of the adhesive or restraining means is eliminated, reduced or rendered ineffective before the O-ring 10 is damaged or destroyed by the heat applied to the seal assembly.

When the adhesive or restraining body 25 is rendered ineffective as a result of the temperature applied to the seal assembly, the secondary seal member 20 may be moved, and will deform as a result of its malleable characteristics into sealing engagement between the members A and B, the copper, aluminum or copper-nickel alloy material or like malleable metallic seal member expanding along the inclined surface 13 to be wedged into tight sealing engagement between the members A and B to close off flow through the flow passage F. The pressure of the fluid acting on the O-ring 10 in the flow passage F will move the secondary seal member 20 to expanded metal-to-metal sealing engagement with the members A and B and so close off flow through the flow passage F by a metal-to-metal seal which will not be damaged by the elevated temperatures.

Thus, in the case of fire, a device such as a valve on an oil and gas well, equipped with the seal assembly just described, instead of having its seal destroyed or damaged to such an extent that the combustible fluids in the well would be permitted to escape through the flow passage F into the fire and increase or feed the fire, would have the secondary seal 20 close off the flow passage and prevent such leakage through the flow passage and reduce or prevent the damage resulting from destruction of the primary seal 10.

In FIG. 2 is shown a seal assembly having on the right hand side of the primary seal O-ring 10 the secondary seal member 20 and back-up or anti-extrusion ring 22, of the type shown in FIG. 1, wherein the secondary seal member is shown to have been moved to deformed sealing engagement with the surfaces D and E of the members A and B, respectively, to close off flow through the flow passage F. The O-ring is not shown as destroyed, but the retaining, restraining adhesive or binder 25 of FIG. 1 is shown as melted or vaporized to permit the secondary seal member 20 to move to the right to deformed sealing position. As shown, the anti-extrusion ring 22 will be moved by the O-ring 10 to the right and force the secondary seal member 20 to the right along the inclined surface 13 into deformed sealing engagement with the cylinder body member A and the shaft B to provide a metal-to-metal seal therebetween to prevent leakage through the flow passage F under conditions of high temperature.

On the left of the O-ring 10 is shown a second secondary seal 30 which is held by an adhesive 35 on an inclined surface 33 formed on the inner portion of the retainer member C. The inclined surface 34 of the secondary seal member is adapted to ride along the inclined surface 33 of the retainer member, when the adhesive or holding means 35 is vaporized or melted and, in the event the pressure is from the right to the left in the flow passage F, the pressure will cause O-ring 10 to engage the end wall or shoulder 31 of the secondary seal member 30 and move the same to deformed sealing engagement with the retaining member C and the bore wall D of the body member A.

The oppositely directed secondary seal members are provided in this form of FIG. 2 to prevent escape of fluid pressure in either direction. In the event the temperature rise is sufficient to release the retaining or holding means 25 or 35 the O-ring 10 will move the one of the secondary seals 20 or 30 into deformed sealing engagement with the body member A and the shaft B or retaining member C, respectively, depending upon the direction of application of fluid pressure to the O-ring 10 in the flow passage F. In the event the O-ring 10 is destroyed by fire, the metallic secondary seals 20 or 30 will nevertheless remain in a deformed sealing engagement closing the passage F.

In FIGS. 3 and 4 are shown a slightly modified form of the seal assembly for providing a high temperature metal-to-metal seal. The annular recess 40 formed in the shaft or member B has an inclined wedge surface 43 extending therefrom toward the member A at a junction point 42 with the surface E of the member B where it merges with the flow passage F. The inclined surface terminates short of the bottom of the recess 40, as is clearly shown; and, therefore, a lesser amount of deformable malleable metal secondary seal member is required. The secondary seal member 46, formed of copper or other malleable soft material, similar to that of the seal member 20 first described, is formed with an inclined surface 44 which is complementary to the inclined surface 43 on the shaft B, and the adhesive or binder material 45 is applied to the inclined surfaces of the secondary seal member and the recess to initially and normally hold the secondary seal member 46 in the position shown in FIGS. 3 and 4, whereby the O-ring primary seal 10 may engage the shoulder 41 at the inner end of the secondary seal member to seal between the shaft B and the body A in the usual manner. In the event of the occurrence of a temperature in excess of that which the binder or adhesive material 45 will withstand, such material evaporates, vaporizes or melts, and the secondary seal member 46 is displaced toward the right by the pressure fluid in the flow passage F acting on the O-ring primary seal 10 and is deformed into metal-to-metal sealing engagement with the shaft member B and the body member A in the same manner as has already been described.

In FIG. 4 the inner end portion of the retaining member C is shown as formed with an inclined surface 49 against which the complementary inclined surface 48 of the opposed oppositely acting seal member 46a is secured by adhesive or binding material 47 in the same manner as the secondary seal member 46. This secondary seal member 46a is also releasable upon melting or evaporization of the binder or adhesive 47 to permit the fluid pressure acting on the O-ring 10 to displace the secondary seal member 46a to the left to deform the same into metal-to-metal sealing engagement with the retaining member C and the body member B, in the event the fluid pressure is acting in a right to left direction. Otherwise, the right hand secondary seal member 46 would be displaced by the fluid pressure acting on the O-ring 10, to deform that secondary seal member into the metal-to-metal sealing engagement with shaft B and the body A, in the same manner as the form first described.

FIGS. 5 and 6 show slight modifications of the seal assembly of FIG. 3, wherein, in FIG. 5, the recess 40a is slightly elongated and a follower or anti-extrusion back-up ring 22 is disposed in the recess between the O-ring primary seal 10 and the shoulder 41 at the inner end of the secondary seal member 46. Otherwise, all parts of the seal assembly of this form are the same as those of the form illustrated in FIG. 3. Similarly, FIG. 6 shows a seal assembly having a pair of opposed oppositely acting seal members identical in all respects to the secondary seal member of FIG. 4, but the recess 40b is further elongated to permit the insertion of a pair of back-up or follower anti-extrusion rings 22 in the groove on opposite sides of the O-ring primary seal 10, against which the O-ring will seal under normal conditions. Upon the occurrence of an elevated temperature which is sufficient to release the adhesive or binding material 45 holding the secondary seal member 46 and the binder material 47 holding the secondary seal member 46a in place, the fluid pressure acting on the O-ring will displace the anti-extrusion rings in the direction of application of fluid pressure and displace the secondary seal member along the inclined surfaces into deformed metal-to-metal sealing engagement with the adjacent shaft and body member or body member and retaining member, respectively. In all other respects, this form of the seal is identical in operation to the form of FIGS. 3 and 4.

In FIGS. 7 and 8 a modified form of the secondary seal member is shown, a single secondary seal member in FIG. 7 and a pair of opposed oppositely acting secondary seal members in FIG. 8. In FIG. 7 an annular recess 50 of elongated cylindrical dimension is formed in the shaft member B with a right angle shoulder 51 at one end. The retaining member C is threaded onto the shaft member B and provides an oppositely facing shoulder 12 against which the O-ring primary seal member 10 is adapted to engage. The secondary seal member includes a metallic wedge expander member 52 having an inclined surface 53 corresponding to the inclined surface 54 of the malleable metallic secondary seal element 55, and the adhesive or binder material 56 is applied to the inclined surfaces of the wedge and the secondary seal element to normally retain the secondary seal element in the undeformed inoperative position shown. When the adhesive or binder material 56 is melted or vaporized or otherwise rendered ineffective to hold the wedge 52 against movement, fluid pressure in the flow passage F acting on the O-ring seal 10 moves the wedge 52 to the right and deforms the secondary seal element 55 into metal-to-metal sealing engagement with the member B at the shoulder 51 and with the bore wall D of the body member A to close off flow through the flow passage F between such members in the same manner as the form first described. In this form, a metallic wedge of material, similar to that of which the shaft or other body member are formed, is utilized to deform the secondary seal element 55 into metal-to-metal sealing engagement between the members to close off flow through the flow passage.

In FIG. 8 the recess 50a is further elongated to receive a pair of opposed identical oppositely facing secondary seal members comprising wedge members 52 and seal elements 55 joined by the adhesive or binder material 56. The shoulder 12 of the retaining member C abuts the right angle shoulder on the end of the secondary seal element 55 in the same manner as the shoulder 51 in the recess abuts the shoulder at the end of the oppositely facing secondary seal element. As shown in FIG. 8, the right hand secondary seal element 55 has been moved to expanded metal-to-metal sealing engagement with the shaft B and body member A to close off fluid flow through the flow passage F. The binder material 56 melts, or is vaporized or otherwise rendered ineffective, and the fluid pressure in the flow passage F acting on the O-ring primary seal 10 displaces the wedge member 52 longitudinally of the recess 50a to deform the right hand secondary seal element 55 into sealing engagement with the body member A and the shaft B.

FIGS. 9 and 10 show secondary seal members in which the malleable metal secondary seal element 65 is V-shaped and an expander wedge member 62 is adhered or bound by a binder material or adhesive 66 along its inclined wedge surfaces 63 to the complementary inclined surfaces of the secondary seal element 65. The O-ring primary seal 10 will move the wedge member 62 to expand the V-shaped secondary seal element 65 into deformed metal-to-metal sealing engagement with the body member A and shaft B in the same manner as in the forms previously described upon the adhesive or binder material 66 being released or rendered ineffective.

In FIG. 10 a pair of opposed oppositely facing and acting secondary seal assemblies are shown, each identical to the secondary seal member of the form of FIG. 9. The recess 60a in which the secondary seal members are disposed is longitudinally elongated to accommodate the opposed secondary seal members and the O-ring primary seal 10 therein. The left-hand secondary seal member 65 is shown to have been deformed into sealing engagement with the body member A, the shaft B and the retaining member C by the fluid pressure in the flow passage F acting on the O-ring primary seal 10 after the adhesive or binder 66 has been melted or otherwise rendered ineffective to hold the wedge against movement. The secondary seal assembly in this form otherwise performs in the same manner as those already described and provides a metal-to-metal high temperature seal between the shaft and body members in the event the primary seal is destroyed or damaged by the elevated temperature.

FIGS. 11 and 12 show a slightly modified form of V-shaped secondary seal member. In this form, the recess 70 in the shaft B receives a secondary seal member having an expander wedge 72 which is adhered or bound by means of adhesive or binder material 76 to the inclined arm surface 74 on an elongated arm 75a of the V-shaped secondary seal element 75. The wedge 72 has a cylindrical surface 72a which rides along the cylindrical surface of the bottom of the recess 70 when the adhesive or binder 74 is rendered ineffective and wedges the elongated arm 75a of the secondary seal element 75 to deform the same into metal-to-metal sealing engagement with the bore wall D of the body member A. Also, the short arm 75b of the V-shaped secondary seal element is deformed into tight metal-to-metal sealing engagement with the bottom of the recess 70 in the shaft member B to provide a metal-to-metal fluid tight seal between the members under conditions of high temperature which would damage or otherwise destroy the primary seal member 10.

The dual opposed oppositely acting secondary seal members shown in FIG. 12 mounted in a longitudinally elongated recess 70a in the body or shaft B. The seal members are each identical to the form of FIG. 11 and are disposed in oppositely facing directions on opposite sides of the primary seal member 10. The secondary seal elements 75 are adapted to seal between the shaft B and the body A to close off the flow passage F therebetween upon the binder or adhesive 76 being rendered ineffective to hold the wedge expander means 72 against movement with respect to the secondary seal elements 75. The secondary seal elements will seal upon application of fluid pressure in either direction to the O-ring primary seal 10 after the adhesive or binder between the wedge members 72 and the secondary seal element 75 has been rendered ineffective, and so provide a metal-to-metal sealing engagement of the malleable metallic seal element 75 with the shaft B, body A and the retaining means C, depending on the direction of application of the pressure acting in the flow passage F.

A further modified form of oppositely acting secondary seal member is shown in FIG. 13 wherein a secondary seal element 85 is formed of a pair of opposed wedge members 85a and 85b having oppositely inclined wedge surfaces 84a and 84b, respectively, engaging the inclined surface 13 in the recess 11 in the shaft member B and the inclined surface 33 on the retaining member C. An annular recess 81 is formed in the mid-portion of the secondary seal element 85 and the O-ring primary seal 10 is disposed in this recess and is adapted to seal between the secondary seal member 85 and the surface D of the member A. Adhesive or binder material 86 is applied to the inclined surfaces 84a and 84b of the secondary seal element 85 and of the inclined surface 13 in the recess 11 and the inclined surface 33 on the retaining member C, as well as between the cylindrical medial portion 82 of the secondary seal element 85 and the bottom of the groove or recess 11. Upon the adhesive or binder 86 being rendered ineffective by an elevated temperature in the manner already described, the fluid pressure in the fluid passage F between the members A and B will act on the O-ring primary seal member 10 and displace the secondary seal element 85 in the direction of application of such fluid pressure to deform the secondary seal element into metal-to-metal sealing engagement with the body and shaft members A and B. In this form of the device, the two opposed oppositely acting sections 85a and 85b of the secondary seal element are a part of a unitary element and the entire element is moved as a unit. Otherwise, the action of the seal element is identical with the dual opposed secondary seal members of the forms already described.

Figure 15:
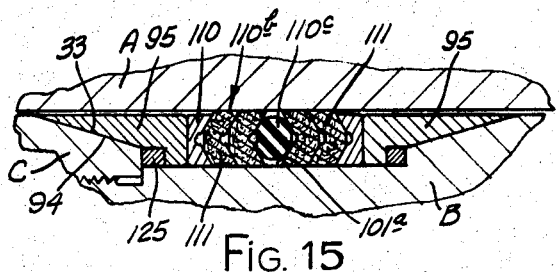
FIG. 15 is a view similar to FIG. 14 showing a pair of opposed oppositely movable secondary seal means having opposed V-type primary seal means.

A further modified form of the seal assembly is shown in FIGS. 14 and 15, wherein the secondary seal element 95 is disposed in an annular recess 101 formed in the shaft member B and adapted to seal with the body and shaft members A and B in the manner already described. The recess 101 has an inclined surface 113 formed at the end thereof opposite the retaining member C and this inclined surface terminates short of the bottom of the recess 101 to provide a stop shoulder 112 against which a propping low temperature melting metal or plastic ring 125 is disposed. The secondary seal element 95 has an inclined surface 94 which is complementary to the inclined surface 113 and is adapted to ride along such inclined surface to be wedged or deformed into metal-to-metal sealing engagement with the members A and B. An annular flange 93 is formed on the inner end portion of the secondary seal element 95 and provides a shoulder 92 which engages the propping ring 125 to limit movement of the secondary seal element 95 along the inclined surface 113 toward wedged deformed sealing engagement. The propping ring 125 may be formed of Cerrometal, or other fusible metal, a suitable epoxy resin plastic material or other heat responsive material which will melt or yield at predetermined temperatures to permit the secondary seal element 95 to be moved by the primary seal member 100 to deformed sealing engagement with the members A and B to close off the flow passage F therebetween. The primary seal member 100 in this form of the seal assembly is a V-type packing or seal assembly which has a base ring 110a and a follower ring 110b abutting the inner end of the secondary seal element 95 and the inner end of the retaining member C and confining a plurality of V-shaped packing rings 111 which are adapted to seal between the bottom of the recess 101 and the surface B of the member A in the usual manner to prevent fluid flow throug hthe flow passage F under normal conditions. The primary seal member 100 will move the secondary seal element 95 along the inclined wedge surface 113 to deform the same into metal-to-metal sealing engagement with the body and shaft members A and B upon the yielding of the prop ring 125 and the application of fluid pressure in the flow passage F to the seal rings 111.

In FIG. 15 is shown a pair of identical oppositely facing opposed oppositely acting secondary seal elements 95 of the type described in FIG. 14, and having a primary seal member 100c disposed therebetween formed of a pair of sets of back-up rings 110a and an O-ring type central follower or spacer ring 110b, opposed V-type seal rings 111 disposed between the back-up rings 110a in the usual manner to provide for sealing off between the members A and B in either direction of the flow passage F. The retaining member C is formed with an inclined surface 33 along which the inclined surface 94 of the secondary seal element 95 is adapted to slide and be deformed into sealing engagement between the retaining member C and the body member A in the usual manner. The recess 101a is elongated longitudinally to accommodate the pair of opposed secondary seal elements and the pair of opposed sets of primary seal rings of the primary seal member 100a. The left hand prop ring 125 engages the inner end of the retaining member C to hold the left hand secondary seal element against movement until such prop ring is rendered ineffective by temperature to hold said seal member against movement.

Figure 16:
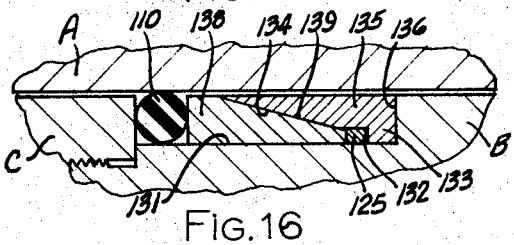
FIG. 16 is a view similar to FIG. 14 of a further modification of the secondary seal means.
Figure 17:
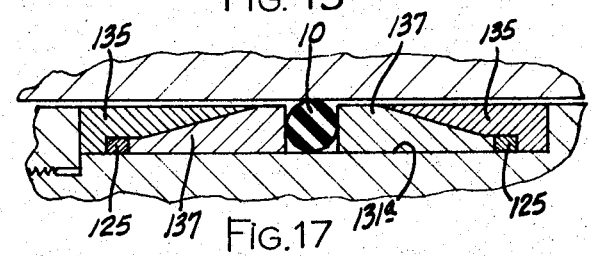
FIG. 17 is a view similar to FIG. 16 showing a pair of opposed oppositely operable secondary seal means of the character shown in FIG. 16.

In the form of the seal assembly shown in FIG. 16, a secondary seal ring 135, which is similar in configuration to that of the secondary seal element 95 of FIG. 14, has the prop ring 125 disposed against the shoulder 132 formed by the flange 133 of the secondary seal element, and an expander wedge 138 having an inclined surface 139 complementary to the inclined surface 134 of the secondary seal element is adapted to be moved to the right upon the prop ring 125 being rendered ineffective by an elevated temperature, so that the secondary seal element 135 is deformed into sealing metal-to-metal sealing engagement with the members A and B. The primary seal member in this form is shown to be an O-ring 10 of the same type as has been heretofore described, though a V-type seal 100 may be used if desired. The recess 131 in which the secondary seal member is disposed corresponds substantially to that of the wedge type assemblies previously described and has a vertical stop shoulder 136 at the end opposite the retaining member C against which the secondary seal element 135 abuts. In FIG. 17 the recess 131a in the shaft member B is longitudinally elongated and a pair of oppositely facing identical opposed secondary seal elements 135 and wedges 138 are disposed in the recess on opposite sides of the primary seal O-ring 10. The secondary seal assemblies include the secondary seal element 135, the wedge member 138 and the propping rings 125, all three of which may be joined with an adhesive into a single body or secondary sealing member or ring member, if desired, to facilitate handling.

Figure 18:
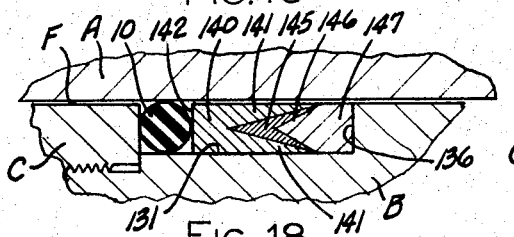
FIG. 18 is a view similar to FIG. 16 showing a still further modified form of V-type secondary seal means.
Figure 19:
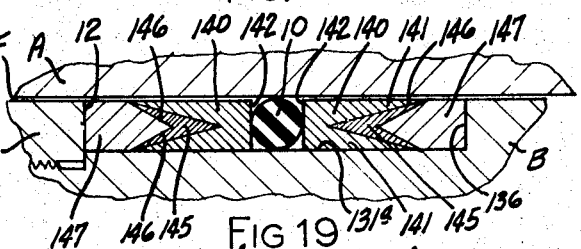
FIG. 19 is a view similar to FIG. 17 showing a pair of opposed V-type secondary seal means of FIG. 18 operable in opposite directions.

In FIGS. 18 and 19 are shown modified V-shaped secondary seal assemblies similar to those of FIGS. 9 and 10. The secondary seal element 140 of FIG. 18 is V-shaped and a body of prop material 145 is disposed between the opposed legs 141 of the V-shaped secondary seal element 140 and the inclined wedge surfaces 146 of a wedge member 147 and the assembly is mounted in the annular recess 131 in the shaft member B. The primary seal O-ring 10 is disposed between the retaining member C and the inner end wall 142 of the secondary seal element 140 and so seals between the seal element and the body and shaft members A and B under normal conditions to close off flow through the flow passage F. The expander wedge member 147 abuts a shoulder 136 at the end of the recess 131 opposite the retaining member C, and when the propping material 145 between the secondary seal element 140 and the expander wedge surfaces 146 of the expander member 147 is rendered ineffective by an elevated temperature, the pressure in the flow passage F acting on the O-ring primary seal 10 will force the secondary seal 140 along the recess 131 to deform the opposed arms or legs 141 thereof into sealing engagement with the body and shaft members A and B to provide a metal-to-metal seal between such members which will resist high temperature leakage through the flow passage. In the dual seal form shown in FIG. 19, the recess 131a is elongated and a pair of opposed sets of secondary seal members is provided therein, each comprising a secondary seal element 140 having V-shaped legs 141 and a body of propping material 145 disposed between the legs 141 of the secondary seal element and the inclined wedging surfaces 146 of the expander wedge 147. The primary seal O-ring 10 is disposed between the inner ends 142 of each of the opposed secondary seal elements 140 and fluid pressure in either direction in the flow passage F will deform the appropriate secondary seal element 140 into metal-to-metal sealing engagement with the body and shaft members A and B, depending upon the direction of application of fluid pressure to the primary seal member 10.

Figure 20:
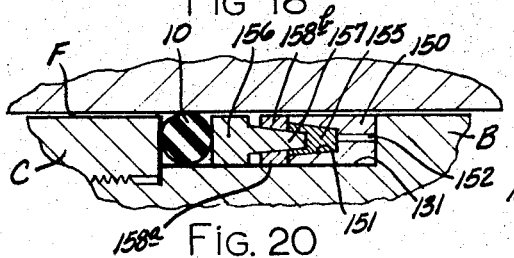
FIG. 20 is a view similar to FIG. 1 of a split ring modification of the secondary seal means.
Figure 21:
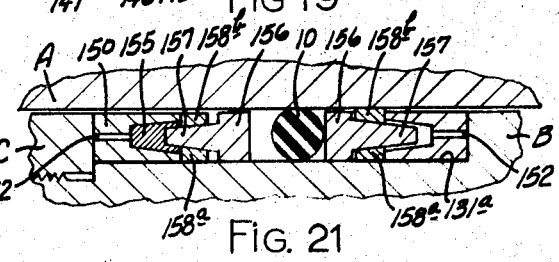
FIG. 21 is a view similar to FIG. 20 showing a pair of opposed split ring secondary means oppositely operable by the primary seal and showing one secondary seal moved to sealing position.

A further modified form of sealing assembly is shown in FIGS. 20 and 21, wherein the recess 131 in the shaft member B receives a metallic retaining member 150 having an annular inwardly convergent recess 151 formed therein which receives and confines a body of prop material 155. An expander wedge ring 156 is formed with a projecting annular expander wedge member 157 which has its blunt projecting end disposed within and held against movement by the body of prop material 155 in the recess 151 of the support ring 150. A plurality of vent openings 152 are formed in the support ring 150 to permit the prop material 155 to be dissipated therethrough upon the application of a predetermined elevated temperature to such prop material. A pair of malleable metallic secondary seal elements 158a and 158b are disposed on opposite sides of the expander wedge member 157 of the expander wedge ring 156 and have their inclined complementary surfaces held against the inclined surfaces of such wedge member. Since each of the secondary seal elements has an inclined surface complementary to the wedge surfaces of the wedge member 157 of the wedge ring 156, movement of the wedge member to the right in FIG. 20 will separate the two malleable metal secondary seal elements 158a and 158b to move the same into sealing engagement with the members A and B to close off flow through the flow passage F. The elements of the secondary seal assembly may be adhered to each other with a light coat of epoxy cement or other adhesive to form a unit which may be readily handled for disposition into the recess 131 in the shaft member B. The retaining member C confines the O-ring primary seal 10 between its inner end and the large end of the wedge ring 156, whereby fluid pressure in the flow passage F will move the wedge expander ring 156 to the right to deform the malleable metallic secondary seal elements 158a and 158b into sealing engagement with the members A and B.

FIG. 21 shows a dual seal assembly in which a pair of identical opposed secondary seal assemblies of the type shown in FIG. 20 are disposed in the elongated recess 131 on opposite sides of the primary seal O-ring 10. The oppositely directed expander wedge rings are adapted to expand the malleable metal secondary seal elements 158a and 158b into sealing engagement with the shaft member B and the body member A. As shown in FIG. 21 on the right hand half thereof, on the application of fluid pressure to the primary seal O-ring 10 in the passage F the propping material 155 which has been melted or vaporized is vented through the passages 152 in the support ring 150 to permit the expander wedge ring to move to deform the secondary seal elements.

Figure 22:
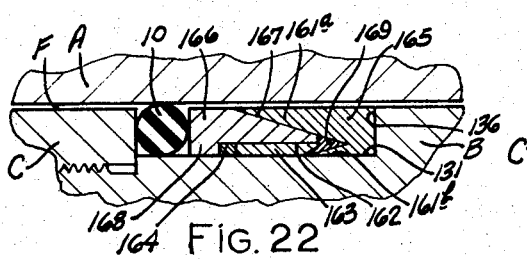
FIG. 22 is a view similar to FIG. 11 showing a further modified form of V-type secondary seal means.
Figure 23:
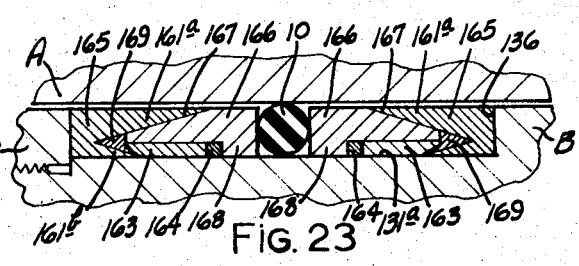
FIG. 23 is a view similar to FIG. 21 showing a pair of oppositely operable V-type secondary seal means of the character illustrated in FIG. 22.

Another form of the V-shaped secondary sealing assembly is illustrated in FIGS. 22 and 23, which resembles the assemblies shown in FIGS. 11 and 12. The recess 131 in the shaft member B receives the primary seal O-ring 10 and the secondary seal assembly including a V-shaped secondary seal element 165 having one elongated arm 161a and a shorter arm 161b. The secondary seal element 165 abuts the shoulder 136 at the end of the recess 131 opposite the retaining member C, and an expander wedge member 166 having a wedge surface 167 which is complementarily inclined to the elongate leg 161a of the secondary seal element 165 is formed with an annular flange 168 which is adapted to ride along the bottom wall of the recess 131. A body of propping material 164 is confined between the flange 168 and a second expander sleeve 163 having a slidable engagement with the cylindrical surface 162 of the expander wedge 166 is adapted to be moved into engagement with the shorter leg 161b of the V-shaped secondary seal element 165 to deform the same into sealing engagement with the shaft member B. A second body of propping material 169 is confined within the V-shaped opening between the legs of the secondary seal element 165 and the ends of the wedge members 166 and 163. Upon application of a sufficiently elevated temperature to the secondary seal assembly, the propping material body 164 and the propping material body 169 will be rendered ineffective to hold the wedge members against movement with respect to the secondary seal element 165, and the wedge members will then be moved by the O-ring 10 to deform the arms 161a and 161b of the secondary seal element 165 into metal-to-metal sealing engagement with the body and shaft members A and B to close off flow through the flow passage F. If desired, the temperature at which the propping bodies 164 and 169 become ineffective may be so selected that the body 169 will first become ineffective and permit the two expander wedge members 166 and 163 to move into the V-shaped opening in the secondary seal element 165 to deform the same into metal-to-metal engagement with the members A and B, and thereafter the propping body 164 will become ineffective to permit the wedge member 166 to move further along with respect to the longer leg 161a of the secondary seal element. Or, if desired, the propping body 164 may first be rendered ineffective to permit the wedge member 166 to deform the elongate leg 161a into sealing engagement with the body member A, and thereafter the body 169 be rendered ineffective to permit the two wedge members 166 and 163 to further deform the secondary seal element 165 into metal-to-metal sealing engagement with the body and shaft members A and B.

FIG. 23 shows a seal assembly in which a pair of the secondary seal assemblies of FIG. 22 are mounted in a longitudinally elongated recess 131a in the shaft member B on opposite sides of the primary seal member 10 and are disposed to seal in opposite directions upon the application of fluid pressure within the flow passage F to the primary seal member 10 to displace the wedge members in the direction of fluid pressure to deform the appropriate secondary seal element 165 into sealing metal-to-metal contact with the members A and B.

Figure 24:
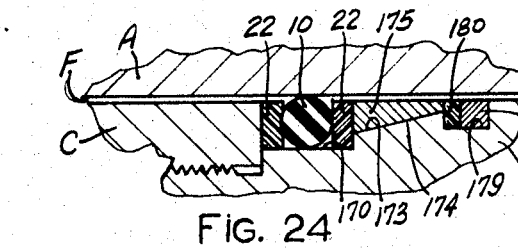
FIG. 24 is a view similar to FIG. 1 showing a further modified form of wedge type secondary seal means and prop means.

FIG. 24 shows a seal assembly similar to the seal assembly of FIG. 5, provided with a pair of back-up or follower anti-extrusion rings 22 on opposite sides of the O-ring primary seal 10, and having a body of propping material restraining deformation of the secondary seal element. The malleable metal secondary seal element 175 has an inclined surface 174 which rides along an inclined surface 173 in the recess 170. The inclined surface terminates short of the bottom of the recess and one anti-extrusion ring 22 abuts against the shoulder formed between the recess 170 and the inclined surface 173. The second anti-extrusion ring 22 abuts the inner end of the retaining member C and the O-ring primary seal 10 is confined between the two anti-extrusion rings 22 in the recess 170. A second recess 179 is formed in the shaft member B outwardly of the inclined surface 173 and provides a receptacle in which a support ring or retaining ring 180 and a prop ring 181 are confined. The prop ring 181 and the follower ring 180 may be split rings for ease of installation into the recess 179. The prop ring and the follower ring hold the malleable secondary seal element 175 against movement along the inclined wedging surface 173 until an elevated temperature has rendered the prop ring 181 ineffective to any longer restrain the ring against such movement. The primary seal O-ring 10 will then be actuated by fluid pressure in the flow passage F to move the follower an anti-extrusion ring 22 to force the secondary seal element 175 along the inclined surface 173 to deform the same into metal-to-metal sealing contact with the body and shaft members A and B to close off flow through the passage F.

Figure 25:
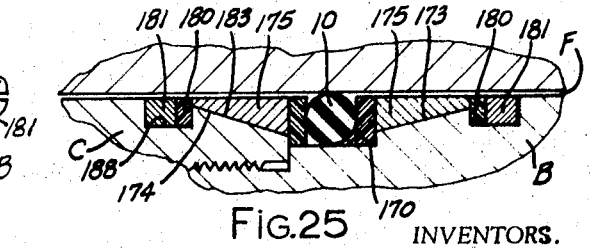
FIG. 25 shows a seal means having a pair of oppositely operable wedge type secondary seal means of the character illustrated in FIG. 24.

FIG. 25 shows a seal assembly having a pair of secondary seal assemblies of the type illustrated in FIG. 24, one disposed in the recess 170 in the body and the shaft member B and the other carried by the retaining member C. The retaining member has an inclined surface 183 along which the inclined surface 174 of the secondary seal element 175 mounted thereon is disposed. An annular recess 188 is formed in the retainer member C outwardly of the end of the inclined surface 183 formed therein and the propping ring 181 and follower ring 180 are mounted in this recess in the same manner as the rings are mounted in the recess 179 of the shaft member B. In this form, either of the secondary seal elements 175 will be expanded to metal-to-metal sealing engagement with the adjacent members A and B or A and C, respectively, on application of fluid pressure in the flow passage F to the primary O-ring seal in an appropriate direction.

Figure 26:
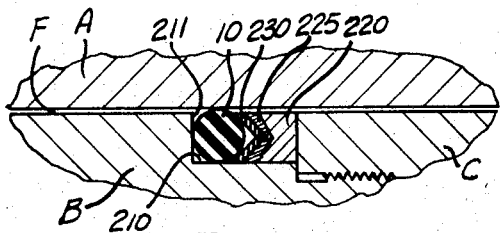
FIG. 26 is a sectional view similar to FIG. 1 of a further modified shortened V-type form of secondary seal means.
Figure 27:
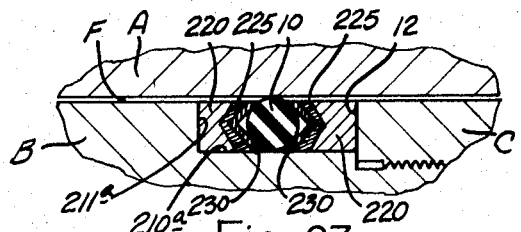
FIG. 27 is a view similar to FIG. 2 showing a pair of opposed shortened V-type secondary seal means of the type illustrated in FIG. 26.

Still another seal assembly is shown in FIGS. 26 and 27, wherein an annular recess 210 is formed in the shaft member B which receives the primary O-ring seal member 10 and the secondary seal assembly, confined by the inner end of the retaining member C. The secondary seal assembly comprises a support ring 220 which is V-shaped and receives a body of prop material 225 within the V-shaped surfaces thereof, and a malleable metal secondary seal element 230 is adhered to the body of prop material 225. The secondary seal element 230 is V-shaped, and the O-ring primary seal 10 is adapted to move between the arms of the V-shaped secondary seal element to deform the same into metal-to-metal sealing engagement with the body and shaft members A and B, as a result of fluid pressure in the flow passage F being applied to the primary seal O-ring 10. The body of prop material 225 will be rendered ineffective by vaporization or melting at a predetermined elevated temperature, and the malleable or deformable metallic secondary seal element 230 may then be deformed into the desired sealing engagement with the body and shaft members A and B.

In FIG. 27 a pair of opposed secondary seal assemblies of the type shown in FIG. 26 are shown disposed in a longitudinally elongated recess 210a on opposite sides of the O-ring primary seal 10, and abutting against the shoulder 211a at one end of the recess and against the inner end 12 of the retainer member C. The secondary seal assemblies of this form are oppositely facing and operative to seal off flow of fluid through the flow passage F in either direction upon the application of fluid pressure to the primary seal O-ring 10 after the prop material 225 has been rendered ineffective whereby the secondary seal element 230 may be deformed into metal-to-metal sealing engagement with the body and shaft members A and B.

Figure 28:
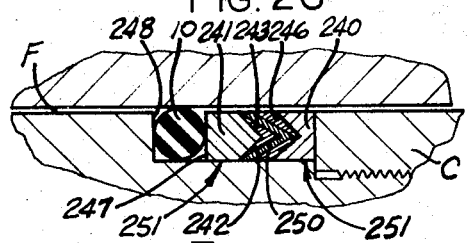
FIG. 28 is a sectional view illustrating still a further modification of the V-type secondary seal means.
Figure 29:
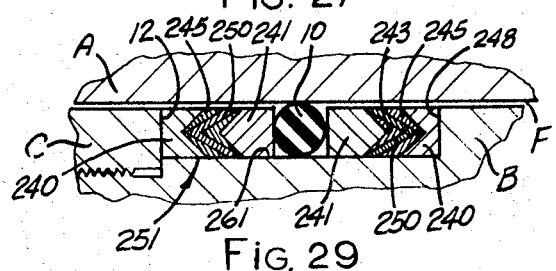
FIG. 29 is a section showing a pair of opposed V-type seal means of the type shown in FIG. 28.

FIGS. 28 and 29 show slightly modified forms of the secondary seal assembly of FIGS. 26 and 27, wherein the prop ring 240 has a V-shaped face in which a body of prop material 245 is disposed to hold a secondary seal element 250 against deformation until the body of prop material has been rendered ineffective. The secondary seal element 250 is malleable or deformable metal and is V-shaped, and a second body of prop material 246 is confined between the arms or legs of the secondary seal element 250 and the wedge surfaces 242 and 243 of the wedge expander member 241. The expander 241, the second propping material body 246, the metallic secondary seal element 250, the first propping material body 245 and the support ring 240 may be adhered together with a suitable adhesive, if the body of propant material is insufficient to hold the same, whereby the several elements are joined into an annular ring secondary seal assembly 251. The primary seal O-ring 10 is disposed between the square end 247 of the wedge expander ring 241 and the shoulder 248 at the end of the recess opposite the retaining member C. Obviously, upon the bodies of propping material 245 and 246 becoming ineffective to hold the secondary seal element 250 against deformation, pressure in the flow passage F acting on the primary seal O-ring 10 will force the wedge member 241 to the right to deform the arms of the secondary seal element 250 into metal-to-metal sealing engagement with the body and shaft members A and B to prevent loss of fluid pressure through the flow passage F.

In FIG. 29 a pair of secondary seal assemblies of the character shown in FIG. 28 are disposed in an elongated recess 261 on opposite sides of the primary seal O-ring 10 and are confined between and abut against the shoulder 248a at one end of the recess and the inner end 12 of the retaining member C. The construction of the secondary seal assemblies 251 is identical to that of the assembly of the form illustrated and described in FIG. 28 and the seal assemblies function and are deformed into metal-to-metal sealing engagement with the body and shaft members A and B in the same manner by fluid pressure acting on the primary seal 10 before destruction or damage of said seal member.

It will further be readily apparent that in certain cases the adhesive or prop material is not necessary to effect the activation of the secondary seal element into sealing engagement between the body and shaft members. For example, in the devices illustrated in FIGS. 1, 3, 5, 7, 9, 11, 14, 16 and 22, if the elevated temperature to which the seal element is subjected is sufficiently high and the material of which the metallic secondary seal element is made has a sufficient coefficient of expansion as a result of heating, the metallic secondary seal element would be caused to expand and engage the wall of the opposite members, whereupon fluid pressure acting upon the secondary seal element would move the seal element further into tight metal-to-metal sealing engagement with the body and shaft members. This would particularly be true where the seal element is disposed on a shaft and is movable to seal against a cylinder wall.

It is believed obvious that all forms of the secondary seal assemblies in which the secondary seal element is V-shaped may be adhered together to form a unitary annular secondary seal element ring assembly. Thus, the forms of FIGS. 7 through 12, and 14 through 23, may be formed as annular units for ease of handling, if desired, as can the forms of FIGS. 26 through 29, inclusive. It will also be seen that the primary seal may be either an O-ring or V-ring or other soft, low-pressure activated seal which is subject to damage or destruction by heat.

It is also believed readily apparent that a secondary seal element having the inclined deforming surface may be provided in the annular recess for movement to deformed metal-to-metal sealing engagement with the two members in one direction and a wedge type seal member such as is shown in FIGS. 9, 11, 18, 22, 26 and 28 may be disposed to engage the flat inner end of the retaining member for deformation in the opposite direction in metal-to-metal sealing engagement with the body and shaft members. An O-ring primary seal or a V-type primary seal may be disposed between the two secondary seal assemblies for activation of either of the seal members in the manner already described.

From the foregoing, it will readily be seen that an improved sealing assembly has been illustrated and described which provides for a primary seal effective under normal conditions of high or low pressure and normal temperatures, and which is provided with a secondary seal assembly having a secondary seat element of malleable metallic material which is deformable into metal-to-metal sealing engagement between two members against which the seal assembly is disposed to seal.

It will also be seen that the secondary seal element may be held against deformation into metal-to-metal sealing engagement with the members with which it is adapted to coact until the restraining or holding means, adhesive, or the like, is rendered ineffective to hold the seal element against movement into such deformed metal-to-metal sealing engagement by the primary seal members. Various means for forming the malleable metal of the secondary seal element have been disclosed, all of which are deformable into metal-to-metal sealing engagement with the members with which they coact. It will be seen that the retaining, restraining, holding or adhesive means prevents the movement of the secondary seal element into such sealing engagement until a predetermined elevated temperature has been applied to the seal assembly which renders the holding means ineffective and permits the fluid pressure acting on the primary seal to move the secondary seal element to deform the same into metal-to-metal sealing engagement with the body and shaft or rod members with which they coact to seal off flow through the flow passage therebetween.

The foregoing description of the invention is explanatory only, and changes in the details of the construction illustrated may be made by those skilled in the art, within the scope of the appended claims, without departing from the spirit of the invention.

What is claimed and desired to be secured by Letters Patent is:

1. A seal assembly for sealing between an inner member and an outer member and including: an annular recess in one of said members; a malleable metallic secondary seal member secured in inactive non-sealing position in said recess against movement to sealing engagement with the other member; primary seal means in said recess initially sealing between said members; means holding said secondary seal means against movement from inactive non-sealing position to engaging sealing position and yieldable under a condition of predetermined elevated temperature to permit said secondary seal member to move with respect to said members to sealing position; said primary seal member being operable to move said secondary seal member from inoperative non-sealing position to sealing position after said means holding said secondary seal member in an inactive position has been rendered ineffective by a temperature in excess of said predetermined temperature.

2. A seal assembly of the character set forth in claim 1 wherein wedge means is provided in said annular recess for positively moving said secondary seal means into sealing engagement with both said members.

3. A device of the character set forth in claim 2 wherein a stop shoulder is disposed in said recess; an oppositely facing shoulder is formed on said secondary seal mean; and said holding means comprises a prop ring of high temperature yieldable material disposed between said opposed shoulders to limit movement of said secondary seal means to deformed sealing position.

4. A device of the character set forth in claim 3 wherein said primary seal means is an elastomeric O-ring.

5. A device of the character set forth in claim 3 wherein said primary seal means is a flexible V-type seal.

6. A device of the character set forth in claim 3 wherein a pair of said secondary seal means are disposed in said annular recess on opposite sides of said primary seal mean; a stop shoulder is disposed in said recess for each of said econdary seal means; and a yieldable prop ring is disposed between the shoulder of each of said secondary seal means and the adjacent opposed shoulder in said recess.

7. A device of the character set forth in claim 6 wherein said holding means frees said secondary seal means at a temperature lower than the temperature at which said primary seal means is damaged or destroyed.

8. A device of the character set forth in claim 6 wherein said primary seal means is an elastomeric O-ring.

9. A device of the character set forth in claim 6 wherein said primary seal means is a flexible V-type seal.

10. A device of the character set forth in claim 1 wherein said means releasably holding said secondary seal means against movement from inactive unsealing positions to engaging active sealing position is a bonding material securing said secondary seal member against movement from such inactive to active sealing position, said bonding material being rendered ineffective to hold said secondary seal means against movement upon application of a predetermined elevated temperature less than the temperature at which said primary seal is damaged or destroyed by heat.

11. A device of the character set forth in claim 1 wherein an anti-extrusion ring is disposed within said annular recess, engageable by said primary seal to restrain said primary seal against extrusion.

12. A device of the character set forth in claim 1 wherein a pair of opposed oppositely acting assemblies are disposed in said recess, each secondary seal assembly compriing a metallic wedge expander member having an inclined surface; a malleable metallic deformable secondary seal element having an inclined surface corresponding to the inclined surface of said expander member; and holding means between said expander and said secondary seal element holding said secondary seal element in said inactive non-sealing position; and said primary seal means is disposed between said opposed secondary seal assemblies.

13. A device of the character set forth in claim 12 wherein said expander member and said secondary seal element have complementary substantially V-shaped surfaces co-engageable, after said holding means is rendered ineffective, to deform said secondary seal element to sealing position.

14. A device of the character set forth in claim 12 wherein: oppositely inclined wedge surfaces are formed at opposite ends of said annular recess; said secondary seal means comprises a unitary malleable metallic ring having a pair of opposed wedge surfaces at its opposite ends complementary to the wedge surfaces of the recess, said holding means between the complementary inclined wedge surfaces of said recess and said seal means yieldable at said elevated temperature to permit said complementary inclined wedge surface at one end of said recess and secondary seal means to be engaged to move said secondary seal means into sealing position; said ring having an annular recess intermediate its end receving and supporting said primary seal means.

15. A seal assembly of the character set forth in claim 1 wherein said annular recess is provided with a pair of oppositely facing secondary malleable metallic seal members secured against displacement from inoperative non-sealing position to operative sealing position sealing between said members and wherein said primary seal member is disposed between said secondary seal members and is operable to move the one of said secondary seal members on the downstream side of said primary seal member to operative sealing position upon said holding means being rendered ineffective inoperative to free said secondary seal means for movement from inactive to operative sealing position.

16. A device of the character set forth in claim 1 wherein said holding means frees said secondary seal means at a temperature lower than the temperature at which said primary seal means is damaged or destroyed.

17. A seal assembly for sealing between an inner member and an outer member having an annular recess formed in one of said members, said seal assembly including: a primary seal means in said recess initially sealing between said members; a malleable metallic secondary seal member initially disposed in an inactive non-sealing position in said recess out of sealing engagement with said members; heat yieldable means holding said secondary seal member against movement from such initial inactive non-sealing position and yielable under a condition of predetermined elevated temperature to permit said secondary seal member to move with respect to said inner and outer members to metal-to-metal sealing engagement therewith; said primary seal member being operable to move said secondary seal member from such initial inactive non-sealing position to metal-to-metal sealing engagement with said members after said holding means is rendered ineffective by a temperature equal to or in excess of said predetermined temperature.

18. A seal assembly of the character set forth in claim 17 wherein wedge means is provided in said annular recess and engageable with said secondary seal member and complementary wedge means is provided on said secondary seal element engageable with said wedge means for deforming said secondary seal member to metal-to-metal sealing engagement with said inner and outer members upon movement of said secondary seal member by said primary seal member.

19. A seal assembly of the character set forth in claim 18 wherein said secondary seal member comprises a pair of opposed oppositely acting malleable metallic secondary seal elements and wedge means for deforming said secondary seal elements to metal-to-metal sealing engagement with the inner and outer members; and said primary seal member is disposed between the oppositely facing secondary seal members and is movable by fluid pressure to deform the secondary seal means on the low pressure side of said primary seal means into metal-to-metal sealing engagement with the inner and outer members.

20. A seal assembly of the character set forth in claim 17 wherein said secondary seal member is substantially V-shaped in cross section; wedge means is provided in said annular recess for deforming said secondary seal member to metal-to-metal sealing engagement with said inner and outer members; and a body of heat yieldable material is disposed between said secondary seal member and said wedge means preventing movement of said secondary seal member to deformed metal-to-metal sealing engagement with said inner and outer members and yieldable to an elevated temperature to become ineffective to hold said secondary seal member against movement to such deformed position.

21. A seal assembly of the character set forth in claim 17 wherein said secondary seal member is formed of a body of malleable metallic material having a pair of divergent inclined surfaces; a body of prop material is confined between the divergent surfaces of the V-shaped secondary seal member and a wedge member is disposed to engage said divergent surfaces of said secondary seal member to deform said seal member to metal-to-metal sealing engagement with the inner and outer members.

22. A seal assembly of the character set forth in claim 17 wherein said holding means is rendered ineffective to hold said secondary seal member against movement from initial inactive position to active metal-to-metal sealing engagement with said inner and outer members by an elevated temperature less than the temperature at which the primary seal member is damaged or destroyed.

23. A seal assembly of the character set forth in claim 17 wherein said secondary seal means comprises a pair of malleable metallic rings having wedge surfaces thereon; said wedge means comprising a member having a wedge surface thereon complementary to and engageable with the wedge surface of the secondary seal element and the holding means is disposed between the wedge surface of the wedge means and the wedge surface of the secondary seal element.

24. A seal assembly of the character set forth in claim 17 wherein said primary seal member is an elastomeric O-ring.

25. A seal assembly of the character set forth in claim 17 wherein said primary seal member comprises an elastomeric O-ring; anti-extrusion rings of yieldable material are disposed in said recess for preventing extrusion of said O-ring by fluid pressure from sealing position in said recess; and said malleable metallic secondary seal member comprises an annular malleable metallic ring deformable to metal-to-metal sealing engagement with the inner and outer members by fluid pressure acting on said O-ring.

References Cited
UNITED STATES PATENTS

| | | | |
|---|---|---|---|
| 2,914,350 | 11/1959 | Smith | 277—26 |
| 3,082,011 | 3/1963 | Kroekel | 277—26 |
| 3,361,430 | 1/1968 | Reid | 277—26 |
| 3,371,946 | 3/1968 | Bleyle et al. | 277—26X |

ROBERT I. SMITH, Primary Examiner